US005902681A

United States Patent [19]

Ueoka et al.

[11] Patent Number: 5,902,681

[45] Date of Patent: May 11, 1999

[54] INSULATED WIRE

[75] Inventors: Isao Ueoka; Akira Mizoguchi; Kazuhiro Matumura, all of Osaka; Yuki Taguchi; Toshiaki Shishino, both of Nagoya, all of Japan

[73] Assignee: Sumitomo Electric Industries, Ltd., Osaka, Japan

[21] Appl. No.: 08/745,366

[22] Filed: Nov. 8, 1996

[51] Int. Cl.[6] .............................. B32B 27/00; D02G 3/00; H01B 7/00

[52] U.S. Cl. .......................... 428/383; 428/375; 428/379; 174/110 PM; 174/120 SR

[58] Field of Search .................................... 428/375, 329, 428/383; 174/110 PM, 120 SR

[56] References Cited

U.S. PATENT DOCUMENTS

| | | | |
|---|---|---|---|
| 3,726,712 | 4/1973 | Rieck | 428/383 |
| 3,775,175 | 11/1973 | Merian | 174/110 PM |
| 4,348,460 | 9/1982 | Saunders et al. | 428/383 |
| 4,350,737 | 9/1982 | Saunders et al. | 174/120 SR |
| 4,378,407 | 3/1983 | Yamamoto et al. | 428/383 |
| 4,379,807 | 4/1983 | Otis et al. | 428/383 |
| 4,390,590 | 6/1983 | Saunders et al. | 174/120 SR |
| 4,410,592 | 10/1983 | Saunders et al. | 174/120 SR |
| 4,420,536 | 12/1983 | Saunders et al. | 174/120 SR |
| 4,612,246 | 9/1986 | Goldberg et al. | 428/379 |
| 4,693,936 | 9/1987 | McGregor et al. | 428/383 |
| 4,716,079 | 12/1987 | Sano et al. | 428/383 |
| 5,219,657 | 6/1993 | Ueoka et al. | 428/379 |
| 5,356,708 | 10/1994 | Matsuura et al. | 174/120 SR |

FOREIGN PATENT DOCUMENTS

| | | |
|---|---|---|
| 2533357 A1 | 3/1984 | France . |
| 5295324 | 1/1993 | Japan . |
| 6012933 | 1/1994 | Japan . |
| 95196451 | 2/1997 | Japan . |
| 1 248 200 | 9/1971 | United Kingdom . |

OTHER PUBLICATIONS

Japanese Industrial Standard, Methods of Test for Enamelled Copper and Enamelled Aluminum Wires, JIS C 3003 –1984.

*Primary Examiner*—Newton Edwards
*Assistant Examiner*—J. M. Gray
*Attorney, Agent, or Firm*—Pillsbury Madison & Sutro LLP

[57] ABSTRACT

An insulated wire having as components a conductor, a first insulating layer on the conductor, and a second insulating layer which comprises a coating resin having a glass transition temperature of between 100 and 250° C. after baking and a lubricant and has a thickness of 0.005 mm or less, which has good lubricity and resistance to processing.

9 Claims, No Drawings

INSULATED WIRE

BACKGROUND OF THE INVENTION

1. Field of the Invention

The present invention relates to an insulated wire having good lubricity and resistance to processing such as winding of magnet wires.

2. Description of the Related Art

It is desirable for a coil to be miniaturized having a high efficiency and a larger number of insulated wires packed into a limited space and increased performances of equipments. Therefore, the coatings of the insulated wires are easily damaged by the needles of automated coil winding machines. The insulated wires often suffer from layer-to-layer short or ground failure. Attempts have been made to prevent the damage to coatings by decreasing a friction coefficient on the surfaces of the insulated wires. In one example, a lubricant such as a wax is coated on the surface of the insulated wire.

However, it is difficult for the above method to apply a uniform coating of the lubricant over the surface of the insulated wire. Furthermore, the insulated wires which are coated with the lubricant should be washed with solvents since the coated lubricants easily gathers dust or foreign particles.

Imparting lubricity to the insulated wires by adding lubricants (e.g. polyethylene, polytetrafluoroethylene, molybdenum disulfide, boron nitride, waxes, etc.) to a varnish for the insulating coating has been investigated.

However, it is extremely difficult to disperse the lubricants homogeneously in the varnish for the insulating coating, since the lubricants are insoluble or hardly soluble in the solvents. Therefore, problems arise such as wire breakage or poor appearance due to the nonuniformity of the insulating coating in the production step of insulated wires.

The wire breakage and poor appearance have been solved by the selection of lubricants and adjustment of the added amount of lubricants, but the obtained insulated wires have insufficient lubricity.

In particular, the above problems are significant when the lubricants are added to polyamideimide or polyimide which is a heat resistant insulating coating resin. Therefore, the heat resistant insulated wires having the coating of polyamideimide or polyimide which has good lubricity have not been produced.

SUMMARY OF THE INVENTION

An object of the present invention is to provide an insulated wire having good lubricity which does not require the coating of lubricants such as waxes on the surface of the insulated wire.

The present invention can greatly improve the lubricity of the coating of polyamideimide or polyimide which is used for the heat resistant insulated wires.

According to the present invention, there is provided an insulated wire comprising a conductor, a first insulating layer on the conductor, and a second insulating layer which comprises a coating resin having a glass transition temperature of between 100 and 250° C. after baking and a lubricant and has a thickness of 0.005 mm or less.

Herein, the glass transition temperature is measured using a DSC (differential scanning calorimeter) (DSC-10 of SEIKO ELECTRONIC Co.).

DETAILED DESCRIPTION OF THE INVENTION

The insulating resin contained in the first insulating layer may be any conventional insulating resin. Examples of such insulating resins are polyimide, polyamideimide, polyesterimide, polyesteramideimide, polyhidantoin, polyester, polyurethane, polyvinyl formal, and the like. The present invention is particularly effective with polyimide and polyamideimide, since none of the conventional insulated wires coated with polyamideimide or polyimide has good lubricity.

The first coating layer may comprises two or more sub-layers each comprising the above insulating resin, or may be made from a blend of two or more of the above insulating resins.

The polyamideimide or polyimide coating resin is a heat resistant coating resin having imide bonds in a molecule. Examples of polyimide coating compounds are PYRE ML (available from E.I. duPont), TORAYNEESE #2000 and #3000 (both available from TORAY), and the like, and examples of the polyamideimide coating compounds are HI-400, HI-405, HI-406 (all available from Hitachi Chemical), and the like.

The second coating layer comprises the insulating resin having the glass transition temperature of between 100 and 250° C. after the coating compound is coated over the first coating layer and baked.

When the glass transition temperature is lower than 100° C. or higher than 250° C., the lubricity of the insulating layer is insufficient, and the effects of the present invention are not achieved.

Such insulating resin may be any insulating resin which has a glass transition temperature in the above range and is soluble in solvents. Examples of such insulating resin are polyester, polyesterimide, polyurethane, polyvinyl formal, polysulfone, polyether sulfone, polyether imide, as well as polyimide, polyamideimide, polyhydantoin, polybenzimidazole and aromatic polyamide which are modified to lower their glass transition temperatures.

Among the insulating coating compounds for the second insulating layer, polyester or polyesterimide coating compounds and polyimide or polyamideimide coating compounds containing a crosslinking agent are preferred, since they achieve the good effects of the present invention. Thus, the polyimide or polyamideimide contained in the second insulating layer has been crosslinked with the crosslinking agent.

The polyester or polyesterimide coating resin is a resin having ester bonds or both ester bonds and imide bonds in a molecule. Examples of the polyester coating compounds are DERACOAT E-270 and E-220 (both available from NITTO DENKO), LITON 3600 and 2100 (both available from TOTOKU PAINT), ISONEL-200 (available from NISSHOKU SCHENECTADY), BRIDGINOLE E1000 (available from DAINICHI SEIKA), and the like. Examples of the polyesterimide coating compounds are ISOMID 40 and RL (both available from NISSHOKU SCHENECTADY), FS-304 and FS-210 (both available from DAINICHI SEIKA), and the like.

The polyamideimide or polyimide coating resin is a heat resistant coating resin having imide bonds in a molecule. Examples of the polyimide coating compounds are PYRE ML (available from E.I. duPont), TORAYNEESE #2000 and #3000 (both available from TORAY), and the like, and examples of the polyamideimide coating compounds are HI-400, HI-405, HI-406 (all available from Hitachi Chemical), and the like.

The solvents contained in the coating compounds for the first and second coating layers are organic solvents. Examples of the organic solvents are:

basic solvents such as dimethylformadide (DMF), dimethyl acetamide (DMAc), N-methyl-2-pyrrolidone ($NM_2P$), etc.;

phenols such as cresol, phenol, xylenol, etc.;

aromatic hydrocarbons such as toluene, xylene, alkylbenzenes, etc.;

ethers such as dioxane, tetrahydrofuran, etc.;

ketones such as methyl ethyl ketone (MEK), cyclohexanone, etc.;

esters such as ethyl acetate, butyl acetate, etc.;

glycols or their esters such as cellosolve, glycocellosolve, etc.

Any crosslinking agent may be used insofar as it reacts with the polyimide or polyamideimide resins or reacts by itself to provide cured materials.

Specific examples of the crosslinking agents are isocyanates or stabilized isocyanates prepared from isocyanates such as DESMODURE AP STABLE and DESMODURE CT STABLE (both available from SUMITOMO BAYER URETHANE), MILLIONATE MS-50 and COLONATE 2503 (both available from NIPPON POLYURETHANE); and thermosetting resins such as phenol resins, melamine resins, alkyd resins, urea resins, acrylic resins, epoxy resins, etc.

Among them, the stabilized isocyanates are preferred because of the good effects on the improvement of lubricity. In particular, COLONATE 2503, MILLIONATE MS-50 and DESMODURE AP STABLE are preferred.

The crosslinking agent is added to the polyimide or polyamideimide coating compound in an amount of between 10 and 1000 wt. parts per 100 wt. parts of the solid content in the coating compound. Preferably, the amount of the crosslinking agent is between 50 and 200 wt. parts per 100 wt. parts of the solid content in the varnish since the effects of the present invention are well achieved.

The lubricant may be any one that can improve the lubricity of the insulating layer such as natural or synthetic waxes or silicones.

Examples of the natural waxes are plant waxes (e.g. candelilla wax, carnauba wax, rice wax, etc.), animal waxes (e.g. bees wax, lanolin, spermaceti wax, etc.), mineral waxes (e.g. montan wax, ozokerite, ceresine, etc.), and petroleum waxes (e.g. paraffin wax, microcrystalline wax, etc.). Examples of the synthetic waxes are synthetic hydrocarbon waxes (e.g. Fischer-Tropsch wax, polyethylene wax, etc.), modified waxes (e.g. montan wax derivatives, paraffin wax derivatives, microcrystalline wax derivatives, etc.), hydrogenated waxes (e.g. hydrogenated castor oil, hydrogenated castor oil derivatives, etc.), 1,12-hydroxystearic acid, stearic acid amide, maleic anhydride imide, and the like.

Examples of the silicones are methylsilicone oil, phenyl silicone oil, their derivatives, and the like.

Mixtures of the waxes and silicones may be used.

The amount of the lubricant is preferably between 0.5 and 10 wt. parts per 100 wt. parts of the solid content in the insulating coating compound which provides the coating having the glass transition temperature of between 100 and 250° C. after coating and baking.

When the amount of the lubricant is less than 0.5 wt. parts, the effect of the lubricant is insufficient. When the amount of the lubricant exceeds 10 wt. parts, the appearance and strength of the coated layer deteriorate.

Among them, the synthetic hydrocarbon waxes such as polyethylene waxes are preferred, since they can impart good lubricity to the insulating layer and are not extracted with washing solvents and refrigerants.

The thickness of the second coating layer containing the lubricant is 0.005 mm or less. When the thickness of the second coating layer exceeds 0.005 mm, the lubricity is not improved. The lower limit of the thickness of the second coating layer cannot be exactly defined since it depends on the combination of materials. For example, the lower limit is about 0.0005 mm, preferably 0.001 mm.

The conductor can be any electrical conductor such as a copper wire, nickel-plated copper wire, aluminum wire, gold wire, gold-plated copper wire, and the like.

The first insulating coating compound is applied on the conductor and baked at a temperature between 400 and 600° C. The thickness of the first insulating layer depends on other conditions such as the size of the conductor. For example, the thickness of the first insulating layer is between 0.020 and 0.050 mm when the diameter of the conductor is 1.0 mm.

Then, the second insulating coating compound is applied on the first insulating layer and baked at a temperature between 400 and 600° C.

EXAMPLES

The present invention will be illustrated by the following examples, which do not limit the scope of the present invention in any way.

Example 1

A polyamideimide varnish (HI-400 available from HITACHI CHEMICAL) as the first insulating varnish was coated on the copper conductor having a diameter of 1.0 mm and baked at 450° C. to form the first coating layer having a thickness of 0.030 mm. Then, the second insulating varnish consisting of a polyester varnish (DERACOAT E-220 available from NITTO DENKO) and a polyethylene (PE) wax (220P available from MITSUI PETROCHEMICAL) in an amount of 3 wt. parts per 100 wt. parts of the solid content in the polyester varnish was coated on the formed first insulating layer and baked at 450° C. to form the second coating layer having a thickness of 0.002 mm.

The properties of the produced insulated wire were measured as follows:

Lubricity

Two insulated wires were extended between a pair of horizontally placed supports, and a weight having two lengths of insulated wires adhered to its bottom was placed on the extended wires with the wires adhered to the weight bottom being perpendicular to the extended wires. The weight was pulled horizontally at a rate of 10 cm/min. and the required force was measured. Then, a coefficient of dynamic friction was calculated according to the following equation:

$$\text{Coefficient of dynamic friction}=F/W$$

in which F is a force (kgW) required for pulling the weight horizontally, and W is a weight (kg) of the weight.

The lubricity was evaluated from the coefficient of dynamic friction.

Flexibility

The flexibility was evaluated according to JIS C 3003-1984 using a cylindrical rod having the same diameter as that of the insulated wire. The insulated wire was ranked "Good" when no crack was observed on the insulating coating.

Abrasion resistance

Abrasion resistance was measured according to JIS C 3003-1984.

Breakdown voltage

The breakdown voltage was measured according to JIS C 3003-1984

The results are shown in Table 1.

Example 2

The insulated wire was produced in the same manner as in Example 1 except that the polyimide varnish (ML available from E.I. duPont) was used in place of the polyamide-imide varnish, and the properties were measured in the same ways as in Example 1.

The results are shown in Table 1.

Example 3

The insulated wire was produced in the same manner as in Example 1 except that the polyesterimide varnish (ISOMID 40 available from NISSHOKU SCHENECTADY) at a film thickness of 0.022 mm and the polyamideimide varnish at a film thickness of 0.008 were successively coated and baked in place of the polyamide-imide varnish, and the properties were measured in the same ways as in Example 1.

The results are shown in Table 1.

Examples 4, 5 and 6

The insulated wires were produced in the same manner as in Example 1 except that the following varnishes were used as the second insulating varnishes in place of the polyester varnish:

Polyesterimide varnish (ISOMID 40 available from NISSHOKU SCHENECTADY) (Example 4);

Polyesterimide varnish (FS-201 available from DAINICHI SEIKA) (Example 5);

Polyester varnish (ISONEL 200) (Example 6).

Then, the properties were measured in the same ways as in Example 1. The results are shown in Table 1.

Comparative Examples 1, 2 and 3

The insulated wires were produced in the same manner as in Example 1 except that the following varnishes were used as the second insulating varnishes in place of the polyester varnish:

Polyimide varnish (ML available from E. I. duPont) (Comparative Example 1);

Polyamideimide varnish (HI-400 available from HITACHI CHEMICAL) (Comparative Example 2);

Polyphenoxy varnish (YP50 CS 25B available from TOHO KASEI Industry) (Comparative Example 3). Then, the properties were measured in the same ways as in Example 1. The results are shown in Table 1.

Examples 7–11

The insulated wires were produced in the same manner as in Example 1 except that the following waxes were used in place of the polyethylene wax:

Carnauba wax (Example 7);

Bees wax (Example 8);

Solid paraffin (Example 9);

Montan wax (Example 10);

Microcrystalline wax (Example 11).

Then, the properties were measured in the same ways as in Example 1. The results are shown in Table 1.

Examples 12–16 and Comparative Example 4 and 5

The insulated wires were produced in the same manner as in Example 1 except that the polyethylene was added to the polyester varnish in the following amounts:

0.3 wt. part (Comparative Example 4);

0.5 wt. part (Example 12)

1.0 wt. part (Example 13)

2.0 wt. parts (Example 14)

5.0 wt. parts (Example 15)

10 wt. parts (Example 16)

15 wt. parts (Comparative Example 5). Then, the lubricities of the insulated wires were measured in the same ways as in Example 1. The results are shown in Table 2.

TABLE 1

| Ex. No. | Ex. 1 | Ex. 2 | Ex. 3 | Ex. 4 | Ex. 5 | Ex. 6 | C. Ex. 1 | C. Ex. 2 | C. Ex. 3 |
|---|---|---|---|---|---|---|---|---|---|
| 2nd varnish | Polyester | Polyester | Polyester | Polyester imide | Polyester imide | Polyester | Polyimide | Polyamide imide | Poly-phenoxy |
| Lubricant (wt. parts) | PE wax (3) | PE wax (3) | PE wax (3) | PE wax (3) | PE wax (3) | PE wax (3) | PE wax (3) | PE wax (3) | PE wax (3) |
| 1st varnish*[1)] | PAI | PI | PEI/PAI | PAI | PAI | PAI | PAI | PAI | PAI |
| Finished diameter (mm) | 1.065 | 1.062 | 1.065 | 1.066 | 1.063 | 1.066 | 0.064 | 1.064 | 1.063 |
| Conductor diameter (mm) | 0.999 | 0.998 | 0.999 | 1.000 | 0.999 | 1.000 | 0.998 | 1.000 | 0.999 |
| Thickness of 1st insulating layer (mm) | 0.031 | 0.030 | 0.031 | 0.031 | 0.030 | 0.031 | 0.031 | 0.030 | 0.030 |
| Thickness of 2nd insulating layer (mm) | 0.002 | 0.002 | 0.002 | 0.002 | 0.002 | 0.002 | 0.002 | 0.002 | 0.002 |
| Flexibility | Good | Good | Good | Good | Good | Good | Good | Good | Good |
| Coefficient of dynamic friction | 0.05 | 0.05 | 0.05 | 0.06 | 0.06 | 0.05 | 0.12 | 0.11 | 0.11 |
| Abrasion resistnce (g) | 1560 | 1610 | 1450 | 1580 | 1510 | 1590 | 1380 | 1350 | 1280 |
| Breakdown voltage (KV) | 12.1 | 13.8 | 12.5 | 12.8 | 12.9 | 13.0 | 12.5 | 12.7 | 12.3 |

TABLE 1-continued

| Ex. No. | Ex. 1 | Ex. 2 | Ex. 3 | Ex. 4 | Ex. 5 | Ex. 6 | C. Ex. 1 | C. Ex. 2 | C. Ex. 3 |
|---|---|---|---|---|---|---|---|---|---|
| Glass transition temp. (° C.) | 135 | 135 | 135 | 185 | 180 | 155 | >400 | 275 | 90 |

Note: *1)PAI: Polyamide imide; PI: Polyimide; PEI: Polyester imide.

TABLE 2

| Example No. | Lubricity (Coefficient of dynamic friction) |
|---|---|
| Example 7 | 0.06 |
| Example 8 | 0.07 |
| Example 9 | 0.08 |
| Example 10 | 0.07 |
| Example 11 | 0.08 |
| Example 12 | 0.08 |
| Example 13 | 0.06 |
| Example 14 | 0.05 |
| Example 15 | 0.06 |
| Example 16 | 0.07 |
| Comp. Ex. 4 | 0.10 |
| Comp. Ex. 5 | 0.11 |

Example 17

A polyamideimide varnish (HI-400 available from HITACHI CHEMICAL) as the first insulating varnish was coated on the copper conductor having a diameter of 1.0 mm and baked at 450° C. to form the first coating layer having a thickness of 0.030 mm. Then, the second insulating varnish consisting of the same polyamideimide varnish as used above (50 wt. parts in terms of the solid content), COLONATE 2503 (available from NIPPON POLYURETHANE) (50 wt. parts in terms of the solid content) and a polyethylene wax (220P available from MITSUI PETROCHEMICAL) (3 wt. parts) was coated on the formed first insulating layer and baked at 450° C. to form the second coating layer having a thickness of 0.002 mm.

The properties of the produced insulated wire were measured in the same ways as in Example 1.

The results are shown in Table 3.

Example 18

The insulated wire was produced in the same manner as in Example 17 except that the polyimide varnish (TORAYNEESE #3000 available from TORAY) was used in place of the polyamideimide varnish in the first and second varnishes, and the properties of the insulated wire were measured in the same ways as in Example 1. The results are shown in Table 3.

Examples 19–23

The insulated wire were produced in the same manner as in Example 17 except that the following materials were used in place of COLONATE 2503:

DESMODURE CT STABLE (Example 19);

DESMODURE AP STABLE (Example 20);

MILLIONATE MS-50 (Example 21);

Melamine resin (SUPER BECKAMINE available from DAINIPPON INK AND CHEMICAL, Inc.);

Phenol resin (PLYHOFEN available from DAINIPPON INK AND CHEMICAL, Inc.).

Then, the properties of the insulated wires were measured in the same ways as in Example 1. The results are shown in Table 3.

Examples 24–28

The insulated wires were produced in the same manner as in Example 17 except that the following waxes were used in place of the polyethylene wax:

Carnauba wax (Example 24);

Bees wax (Example 25);

Solid paraffin (Example 26);

Montan wax (Example 27);

Microcrystalline wax (Example 28).

Then, the properties were measured in the same ways as in Example 1. The results are shown in Table 3.

Examples 29–33 and Comparative Example 6 and 7

The insulated wires were produced in the same manner as in Example 17 except that the polyethylene was added to the polyester varnish in the following amounts:

0.3 wt. part (Comparative Example 6);

0.5 wt. part (Example 29)

1.0 wt. part (Example 30)

2.0 wt. parts (Example 31)

5.0 wt. parts (Example 32)

10 wt. parts (Example 33)

15 wt. parts (Comparative Example 7).

Then, the lubricities of the insulated wires were measured in the same ways as in Example 1. The results are shown in Table 4.

Examples 34–37

The insulated wires were produced in the same manner as in Example 17 except that the amounts of the polyamideimide varnish and COLONATE 2503 were changed as follows:

(Example 34)

Polyamideimide: 80 wt. parts

COLONATE 2503: 20 wt. parts

Glass transition temperature: 245° C.

(Example 35)

Polyamideimide: 60 wt. parts

COLONATE 2503: 40 wt. parts

Glass transition temperature: 230° C.

(Example 36)

Polyamideimide: 40 wt. parts

COLONATE 2503: 60 wt. parts

Glass transition temperature: 210° C.

(Example 37)

Polyamideimide: 20 wt. parts

COLONATE 2503: 80 wt. parts

Glass transition temperature: 190° C.

Then, the lubricities of the insulated wires were measured in the same ways as in Example 1. The results are shown in Table 4.

TABLE 3

| Ex. No. | Ex. 17 | Ex. 18 | Ex. 19 | Ex. 20 | Ex. 21 | Ex. 22 | Ex. 23 |
|---|---|---|---|---|---|---|---|
| 2nd varnish | Polyamide-imide | Polyimide | Polyamide-imide | Polyamide-imide | Polyamide-imide | Polyamide-imide | Polyamide-imide |
| Crosslinking agent | COLONATE | COLONATE | CT STABLE | AP STABLE | MS-50 | Melamine resin | Phenol resin |
| Lubricant | PE wax | PE wax | PE wax | PE wax | PE wax | PE wax | PE wax |
| (wt. parts) | (3) | (3) | (3) | (3) | (3) | (3) | (3) |
| 1st varnish*1) | PAI | PI | PAI | PAI | PAI | PAI | PAI |
| Finished diameter (mm) | 1.063 | 1.062 | 1.067 | 1.064 | 1.063 | 1.068 | 1.064 |
| Conductor diameter (mm) | 0.999 | 0.998 | 0.999 | 1.000 | 0.999 | 1.000 | 1.000 |
| Thickness of 1st insulating layer (mm) | 0.030 | 0.030 | 0.032 | 0.030 | 0.030 | 0.032 | 0.030 |
| Thickness of 2nd insulating layer (mm) | 0.002 | 0.002 | 0.002 | 0.002 | 0.002 | 0.002 | 0.002 |
| Flexibility | Good | Good | Good | Good | Good | Good | Good |
| Coefficient of dynamic friction | 0.05 | 0.06 | 0.08 | 0.05 | 0.06 | 0.07 | 0.07 |
| Abrasion resistnce (g) | 1580 | 1620 | 1500 | 1540 | 1550 | 1500 | 1480 |
| Breakdown voltage (KV) | 12.6 | 13.5 | 12.7 | 12.0 | 12.8 | 13.1 | 13.2 |
| Glass transition temp. (° C.) | 225 | 235 | 240 | 220 | 230 | 220 | 215 |

Note: *1)PAI: Polyamide imide; PI: Polyimide; PEI: Polyester imide.

TABLE 4

| Example No. | Lubricity (Coefficient of dynamic friction) |
|---|---|
| Example 24 | 0.06 |
| Example 25 | 0.08 |
| Example 26 | 0.08 |
| Example 27 | 0.07 |
| Example 28 | 0.08 |
| Example 29 | 0.07 |
| Example 30 | 0.05 |
| Example 31 | 0.05 |
| Example 32 | 0.06 |
| Example 33 | 0.06 |
| Comp. Ex. 6 | 0.11 |
| Comp. Ex. 7 | 0.11 |
| Example 34 | 0.09 |
| Example 36 | 0.05 |
| Example 37 | 0.05 |
| Example 38 | 0.08 |

What is claimed is:

1. An insulated wire comprising:

(i) a conductor, (ii) a first insulating layer on said conductor, which contains at least one sub-layer, which comprises at least one resin (A) selected from the group consisting of polyimide, polyamideimide and polyesterimide; and (iii) a second insulating layer, which is in contact with the outermost sub-layer of said first insulating layer; said second insulating layer having a thickness of 0.005 mm or less, and comprising:

(a) at least one resin (B) having a glass transition temperature of between 100 and 250° C. after baking, selected from the group consisting of polyimide which has been crosslinked with a crosslinking agent and polyamideimide, which has been crosslinked with a crosslinking agent, and (b) a lubricant, wherein the outermost sub-layer of said first insulating layer, which is in contact with said second insulating layer, comprises at least one resin selected from the group consisting of polyimide and polyamideimide.

2. The insulated wire according to claim 1, wherein said lubricant is contained in an amount of between 0.5 and 10 wt. parts per 100 wt. parts of a solid content in a coating resin for said second insulating layer.

3. The insulated wire of claim 1, wherein said lubricant is a polyethylene wax.

4. The insulated wire according to claim 1, wherein a weight ratio of polyimide or polyamideimide to the crosslinking agent is between 90:10 and 10:90.

5. The insulated wire according to claim 4, wherein said crosslinking agent is a stabilized isocyanate.

6. The insulated wire according to claim 1 wherein a weight ratio of polyimide or polyamideimide to the crosslinking agent is between 70:30 and 30:70.

7. An insulated wire comprising:

(i) a conductor, (ii) a first insulating layer on said conductor, which contains at least one sub-layer, which comprises at least one resin (A) selected from the group consisting of polyimide, polyamideimide and polyesterimide; and (iii) a second insulating layer, which is in contact with the outermost sub-layer of said first insulating layer; said second insulating layer having a thickness of 0.005 mm or less, and comprising:

(a) at least one resin (B) having a glass transition temperature of between 100 and 250° C. after baking; selected from the group consisting of polyester and polyesterimide, and (b) a lubricant, wherein the outermost sub-layer of said first insulating layer, which is in contact with said second insulating layer, comprises at least one resin selected from the group consisting of polyimide and polyamideimide.

8. The insulated wire according to claim 7, wherein said lubricant is contained in an amount of between 0.5 and 10 wt. parts per 100 wt. parts of a solid content in a coating resin for said second insulating layer.

9. The insulated wire of claim 7, wherein said lubricant is a polyethylene wax.

* * * * *